US008543298B2

(12) United States Patent
Kontz et al.

(10) Patent No.: US 8,543,298 B2
(45) Date of Patent: Sep. 24, 2013

(54) OPERATOR INTERFACE WITH TACTILE FEEDBACK

(75) Inventors: Matthew E. Kontz, Chillicothe, IL (US); Jeffrey L. Kuehn, Germantown Hills, IL (US); Rustin G. Metzger, Congerville, IL (US); David E. Ault, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 138 days.

(21) Appl. No.: 13/152,632

(22) Filed: Jun. 3, 2011

(65) Prior Publication Data

US 2012/0310490 A1 Dec. 6, 2012

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |

(52) U.S. Cl.
USPC .......... 701/50

(58) Field of Classification Search
USPC .......... 701/31.4, 41, 50; 345/156, 158, 345/161, 164, 167; 180/316, 333, 446, 6.48, 180/197, 327; 200/5 R, 6 A, 11 R, 16 A, 200/1 B, 335, 437, 61.45 R, 61.85; 318/568.11, 318/568.18; 341/20, 21; 74/512, 526, 527, 74/143, 473.21, 473.23, 473.26, 478, 501.6, 74/502.2, 513, 540, 7 A, 99 R; 91/361, 466, 91/471; 194/239
See application file for complete search history.

(56) References Cited

U.S. PATENT DOCUMENTS

| | | | | |
|---|---|---|---|---|
| 4,501,939 | A * | 2/1985 | Hyltin et al. | 200/6 A |
| 5,598,090 | A * | 1/1997 | Baker et al. | 322/3 |
| 6,047,245 | A * | 4/2000 | Ott et al. | 702/104 |
| 6,140,787 | A * | 10/2000 | Lokhorst et al. | 318/568.18 |
| 6,693,625 | B2 | 2/2004 | Armstrong | |
| 7,041,029 | B2 | 5/2006 | Fulghum et al. | |
| 7,129,428 | B2 | 10/2006 | Edmunds | |
| 7,379,806 | B2 | 5/2008 | Lee | |
| 7,492,353 | B2 | 2/2009 | Ushimaru et al. | |
| 7,656,385 | B2 * | 2/2010 | Arche et al. | 345/156 |
| 7,753,077 | B2 | 7/2010 | Bertolasi et al. | |
| 7,753,078 | B2 | 7/2010 | Bertolasi et al. | |
| 7,784,581 | B1 | 8/2010 | Klas et al. | |
| 2002/0153188 | A1 | 10/2002 | Brandt et al. | |
| 2002/0190948 | A1 | 12/2002 | Coutant et al. | |
| 2005/0023071 | A1 | 2/2005 | Ahnafield | |
| 2009/0213073 | A1 | 8/2009 | Obermeyer et al. | |
| 2009/0222167 | A1 * | 9/2009 | Goodwin et al. | 701/41 |
| 2010/0302017 | A1 | 12/2010 | Guglielmo | |
| 2011/0060508 | A1 | 3/2011 | Filla | |

FOREIGN PATENT DOCUMENTS

| | | | |
|---|---|---|---|
| JP | 06-313326 | A | 11/1994 |
| JP | 2010-248867 | A | 11/2010 |
| WO | 2008-153529 | A1 | 12/2008 |

* cited by examiner

*Primary Examiner* — Thomas Black
*Assistant Examiner* — Isaac Smith
(74) *Attorney, Agent, or Firm* — Robin S. Fahlberg

(57) ABSTRACT

An operator interface assembly for a machine includes a base, an operator input device, a first biasing member, and a second biasing member. The operator input device is operable to move in a direction in relation to the base. The first biasing member is operable to contact the operator input device at a first position and resist movement of the operator input device in the direction. The second biasing member is operable to contact the operator input device at a second position and resist movement of the operator input device in the direction.

19 Claims, 7 Drawing Sheets

OPERATOR INTERFACE WITH TACTILE FEEDBACK

TECHNICAL FIELD

The present disclosure relates generally to operator interface assemblies. Specifically, the present invention relates to a joystick assembly.

BACKGROUND

Operators of machinery may depend on tactile feedback from operator input devices to control fine movements of implements. Electrically actuated valve control of implements may not provide the tactile feedback that operators expect making fine movement of implements difficult.

Patent Application Publication no. US 2005/0023071 A1, filed by Bruce Ahnafield, discloses a joystick operated driving system which includes a controller slide member with a tactile feedback and centering feature. This feature includes opposing springs that center the controller slide member within a slide channel when no pressure is applied to a grip platform. In addition, the opposing springs provide tactile feedback or resistance as the controller grip platform, and therefore the controller slide member 58, is moved further in the forward or backward directions.

SUMMARY OF THE INVENTION

In one aspect of the disclosure, an operator interface assembly for a machine includes a base, an operator input device, a first biasing member, a second biasing member, and a position sensor. The operator input device is operable to move in a first direction in relation to the base. The first biasing member is operatively associated with the base and operable to contact the operator input device at a first position and resist movement of the operator input device in the first direction. The second biasing member is operatively associated with the base and operable to contact the operator input device at a second position, the second position different than the first position, and resist movement of the operator input device in the first direction. The position sensor is configured to generate a position signal for generating a machine function control signal. The position signal is indicative of the operator input device position.

In another aspect of the invention, a machine includes an implement, an implement control system, an operator interface assembly, and a controller. The implement actuation system is configured to begin actuation of the implement as a function of a valve control signal. The operator interface assembly includes a base, an operator input device, a first biasing member, a second biasing member, and an electronic position sensor. The operator input device is operable to move in a direction in relation to the base. The first biasing member is operatively associated with the base and operable to contact the operator input device at a first position and resist movement of the operator input device in the first direction. The second biasing member is operatively associated with the base and operable to contact the operator input device at a second position, the second position different than the first position, and resist movement of the operator input device in the first direction. The electronic position sensor is configured to generate an electronic position signal. The electronic position signal is indicative of the operator input device position. The controller is configured to generate a valve control signal as a function of the electronic position signal.

In another aspect of the disclosure, an operator interface assembly includes a base, a joystick, a first spring, a second spring, and an electronic position sensor. The base includes a first spring rest, a second spring rest, a first spring support, and a second spring support. The joystick is pivotally connected to the base, and operable to pivot in a first direction from a first position to a second position and a third position in relation to the base. The joystick includes a first tab having a first tab contact surface, and a second tab having a second tab contact surface. The first spring is coiled around the first spring support and includes a first spring end. The first spring end contacts the first spring rest and the first tab contact surface when the joystick is in the first position. The second spring is coiled around the second spring support and includes a second spring end. The second spring end contacts the second spring rest and is an offset distance from the second tab contact surface when the joystick is in the first position. The second spring end contacts the second tab contact surface when the joystick is in the second position. The electronic position sensor is operable to generate an electronic position signal indicative of the joystick position for generating a machine function control signal when the joystick is in the third position.

In another aspect of the invention, a method for calibrating tactile feedback for an operator input device includes moving the operator input device in a first direction, contacting a second biasing member, and generating a calibration signal. The operator input device is moved in relation to a base from a first position to a second position against a resistive force from a first biasing member. The second biasing member is contacted with the operator input device at the second position. The second biasing member resists the movement of the operator input device in the first direction. The calibration signal is generated when the operator device is in the second position.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
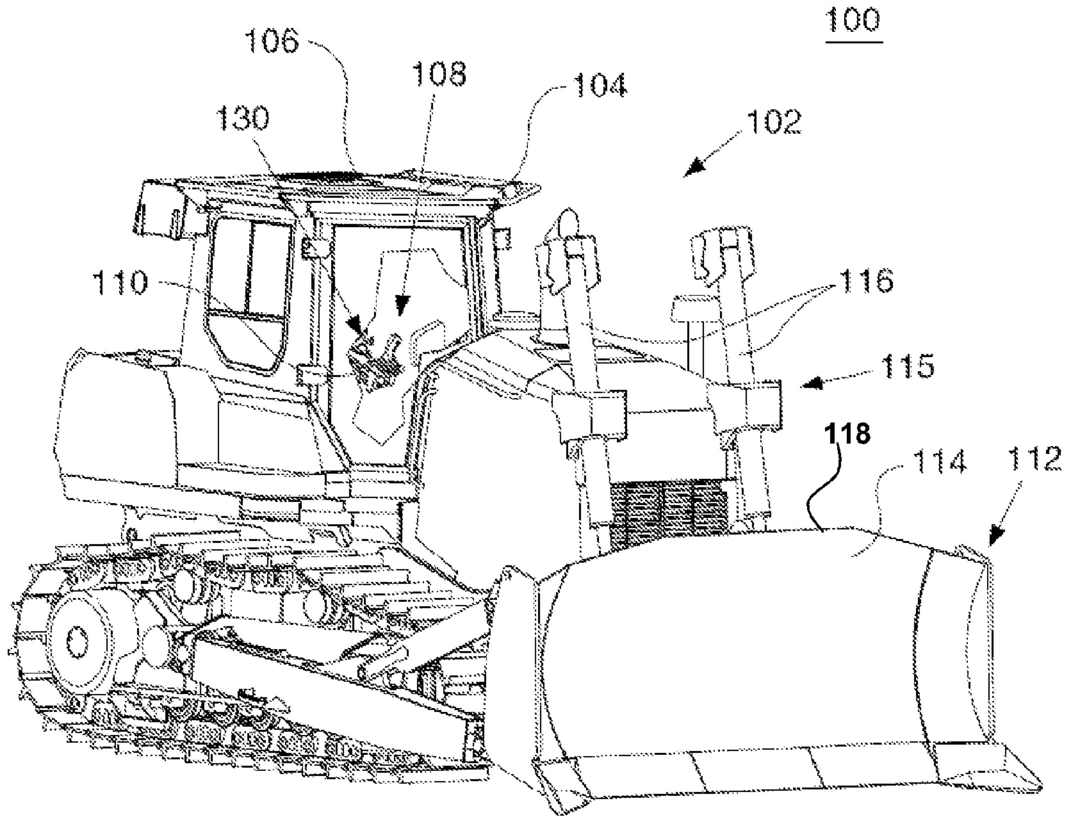
FIG. 1 illustrates a machine having an operator interface assembly in accordance with an exemplary embodiment of the present disclosure.

Referring to FIG. 1, an exemplary embodiment of a machine 100 is depicted. In the embodiment the machine 100 is depicted as a vehicle 102, and in particular a tracked dozer 104. In other embodiments, the machine 100 may include any system or device for doing work. The machine 100 may include both vehicles 102 or stationary machines (not shown) such as, but not limited to, electric power generating devices, crushers, conveyors or any other stationary machine that would be known to an ordinary person skilled in the art now or in the future. The vehicle 102 may include but is not limited to work vehicles that perform some type of operation associated with a particular industry such as mining, construction, farming, transportation, etc. and operate between or within work environments (e.g. construction site, mine site, power plants, on-highway applications, marine applications, etc.). Non-limiting examples of vehicle 102 include trucks, cranes, earthmoving vehicles, mining vehicles, backhoes, loaders, material handling equipment, farming equipment, and any type of movable machine that would be known by an ordinary person skilled in the art now or in the future. Vehicle 102 may include mobile machines which operate on land, in water, in the earth's atmosphere, or in space. Land vehicles may include mobile machines with tires, tracks, or other ground engaging devices.

Figure 2:
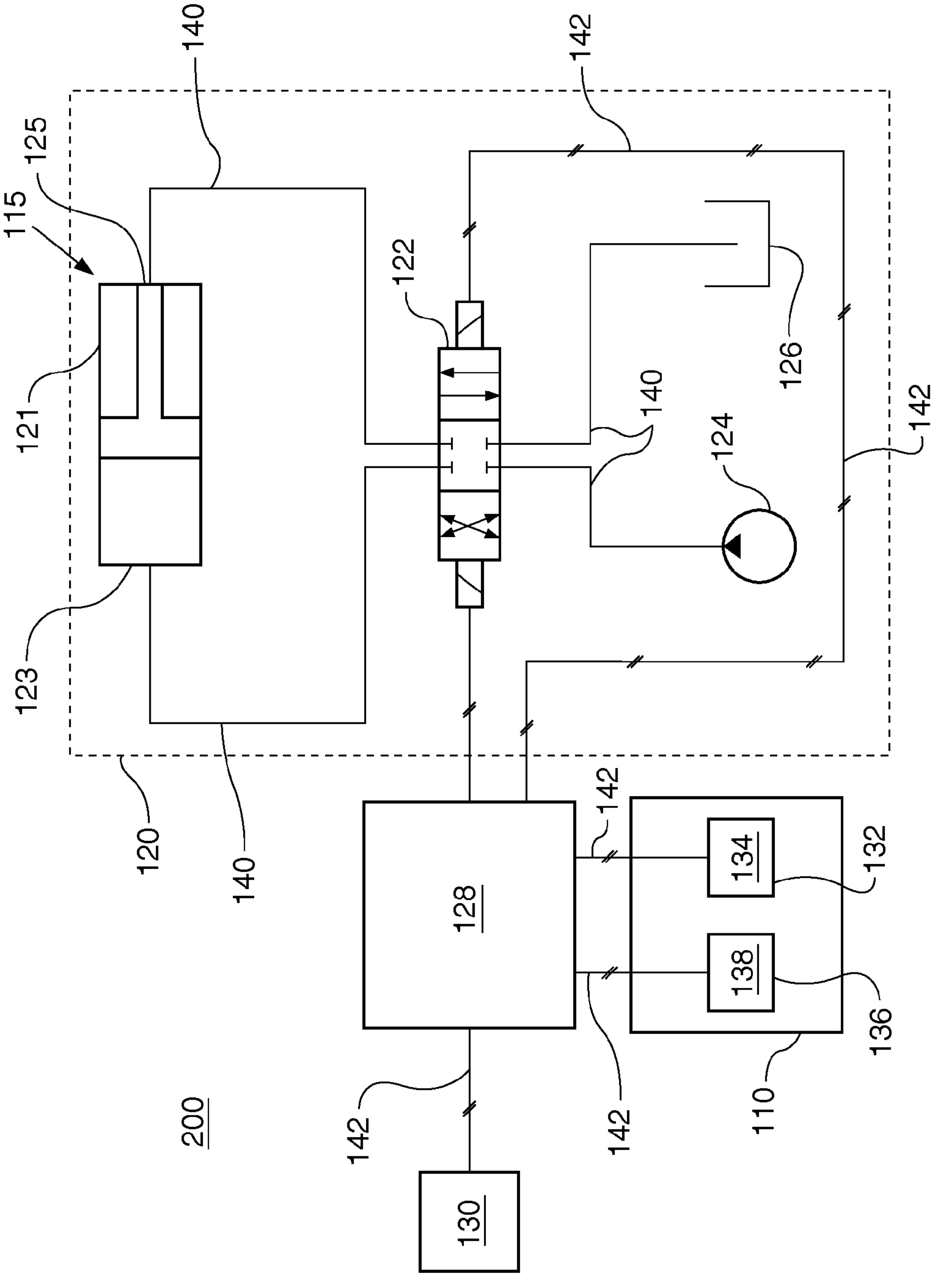
FIG. 2 illustrates a machine system having an implement actuation system in accordance with an exemplary embodiment of the present disclosure.

The machine 100 includes a power source (not shown), an implement 112, an implement actuation system 120 (shown in relation to FIG. 2), an operator interface assembly 110, and a controller 128 (shown in relation to FIG. 2).

The machine 100 may include an operator station or cab 106 containing input devices 108 necessary to operate the machine 100. The input devices 108, may, for example, be used for propelling or steering the machine 100 or controlling other machine 100 components or functions. The input devices 108 may include the operator interface assembly 110 and a confirmation input device 130 (explained in relation to FIGS. 2 and 6).

In other embodiments the operator interface assembly 110 may be located off-board the machine 100, in another location, and may control a machine 100 function remotely. The operator interface assembly 110 may be located in any location where the operator interface assembly 110 is operable to communicate with the controller 128 as would be known by an ordinary person skilled in the art now or in the future.

The confirmation input device 130 may also be located off board in some embodiments. The confirmation input device 130 may be located in any location where the confirmation input device 130 is operable to communicate with the controller 128 as would be known by an ordinary person skilled in the art now or in the future.

In the tracked dozer 104 embodiment depicted, the implement 112 includes a blade 114 for moving earth. In other embodiments the implement 112 may include buckets, rippers, brooms, hammers, forks, backhoes, felling heads, grapples, harvester heads, lift groups, material handling arms, mulchers, multi-processors, rakes, saws, scarifiers, shears, snowblowers, snow plows and wings, stump grinders, thumbs, tillers, trenchers, truss booms, or any other implement 112 that would be known by an ordinary person skilled in the art now or in the future.

The machine 100 includes actuators 115 for actuating the implement 112. In the depicted embodiment the actuators 115 includes 2 lift actuators 116 and a tilt actuator 118 (not showing) for moving the blade 114 in various positions. The actuators 115 may be used for lifting the blade 114 up or lowering the blade 114 down, tilting the blade 114 left or right, or pitching the blade 114 forward or backward.

In the depicted embodiment, the lift actuators 116 and the tilt actuator 118 include hydraulic cylinders. In other alternative embodiments, the actuators 115 may be electric motors, hydraulic motors, gear driven linear actuators, belt driven actuators, or any other type actuator that would be known by an ordinary person skilled in the art now or in the future, In the depicted embodiment in FIG. 1, the operator interface assembly 110 is operable to control at least one function of the machine 100. For example, the operator interface 110 may be operable to lift and lower the blade 114, by actuating one or both of the lift actuators 116. In other embodiments the operator interface assembly 110 may be operable to move any implement 112, and/or may control steering, velocity, or any one or more functions of machine 100.

Referring now to FIG. 2, an exemplary machine system 200 for actuating an implement 112 is depicted. The machine system 200 includes an implement actuation system 120, a controller 128, an operator input assembly 110, and communication links 142. The machine system 200 may additionally include a confirmation input device 130.

The implement actuation system 120 may include any system configured to actuate an implement 112 as a function of an implement control signal. In the depicted embodiment, the implement system 120 is a hydraulic system including a solenoid actuated valve 122, a pump 124, a tank 126, an actuator 115, and fluid conduits 140. The actuator 115 is a hydraulic cylinder 121 with a head end 123 and a rod end 125.

In alternate embodiments, the implement actuation system 120 may include electrical actuation systems, mechanical actuation systems, or any actuation system which would be known by an ordinary person skilled in the art now or in the future.

In the depicted embodiment, the solenoid actuated valve 122 allows pressurized fluid to selectively flow from the pump 124, through the fluid conduits 140 to either the head end 123 or the rod end 125 of the hydraulic cylinder 121, depending on valve 122 position. The pressurized fluid extends or retracts the rod pushing fluid out the opposite side of the hydraulic cylinder 121, through fluid conduit 140, to tank 126. Operation of hydraulic actuation circuits, such as the one depicted, to actuate implements 112 with hydraulic cylinders 121 is well known in the art.

The controller 128 is communicatively coupled to the valve 122 through communication link 142, and operable to send an implement control signal to the valve 122. The implement control signal causes actuation of the valve 122 allowing pressurized fluid to flow from the pump 124 to the actuator 115 to actuate the implement 112. In the depicted embodiment current is supplied to one of the solenoids on the valve 122 as a function of the implement control signal. The implement control signal may include the current itself supplied from the controller 128, or in an alternative embodiment the implement control signal may include a communication signal that causes current to flow to the solenoid from a separate power source (not shown)

The controller 128 may include a processor (not shown) and a memory component (not shown). The processor may include microprocessors or other processors as known in the art. In some embodiments the processor may include multiple processors. The processor may execute instructions for generating a machine function control signal as a function of a position signal, and for implementing a method, as described below and in relation to FIG. 6, for calibrating tactile feedback for an operator input device 160 (shown in relation to FIGS. 3A, 3B, 4A, and 4B). In the depicted embodiment, the processor may execute instructions for generating an implement control signal to actuate the valve 122 as a function of the position signal. Such instructions may be read into or incorporated into a computer readable medium, such as the memory component or provided external to processor. In alternative embodiments, hard-wired circuitry may be used in place of or in combination with software instructions to generate the machine function control signal and implement the method for calibrating tactile feedback for an operator input device 160. Thus embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above or which would be known to an ordinary person skilled in the art now or in the future. The memory component may include multiple memory components.

The controller 128 may be enclosed in a single housing. In alternative embodiments, the controller 128 may include a plurality of components operably connected and enclosed in a plurality of housings. The controller 128 may be located on-board the machine, or may be located off-board or remotely.

The operator input assembly 110 includes a position sensor 132, and may additionally include a contact sensor 136. The position sensor 132 may include an electronic position sensor 134. The contact sensor 136 may include a thin film contact sensor 138.

The position sensor 132 is communicatively coupled to the controller 128 through communication link 142. The contact sensor 136 is communicatively coupled to the controller 128. The confirmation input device 130 is communicatively coupled to the controller 128.

Figure 3A:
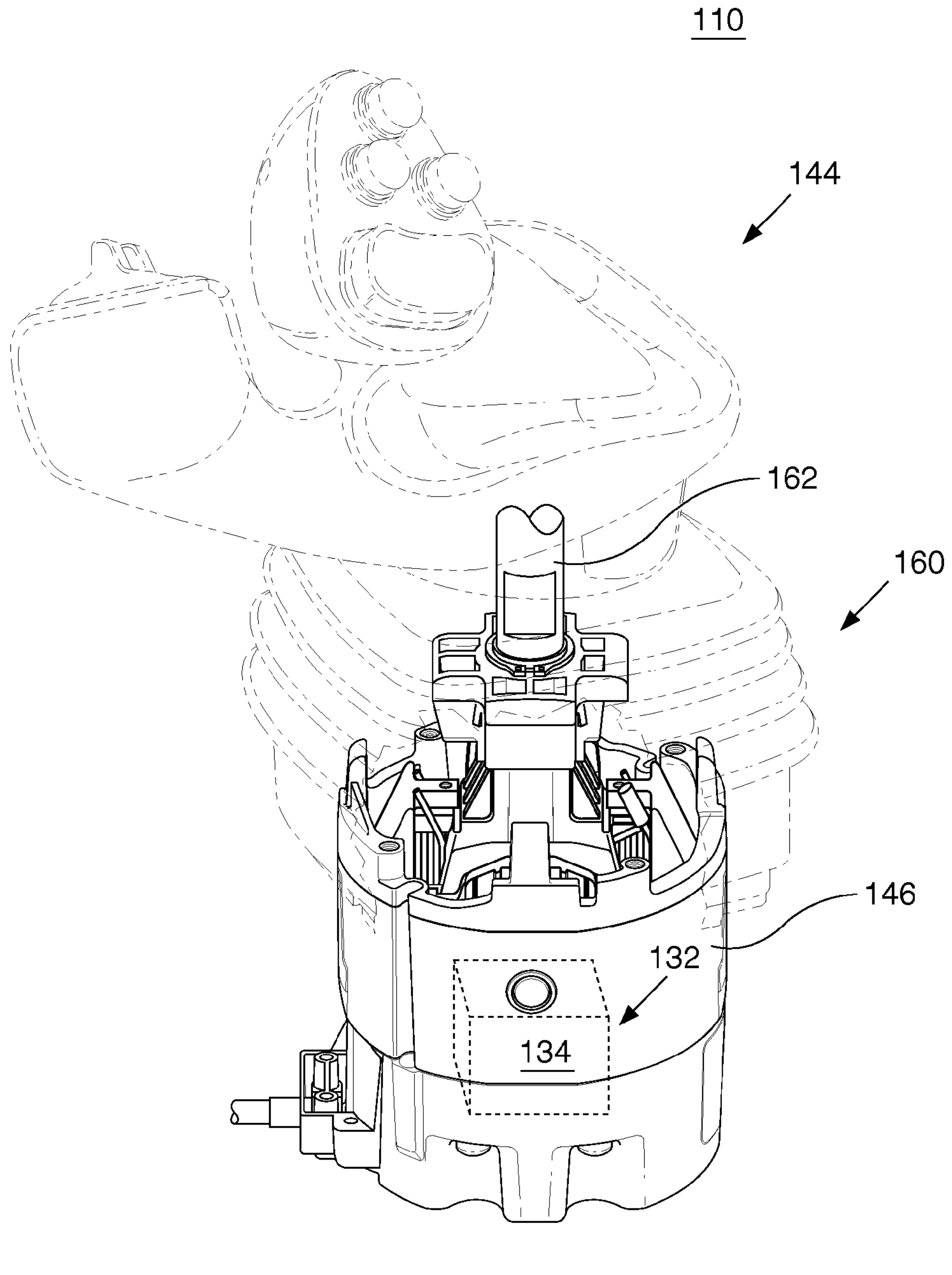
FIG. 3A illustrates an exemplary embodiment of an operator interface assembly.
Figure 3B:
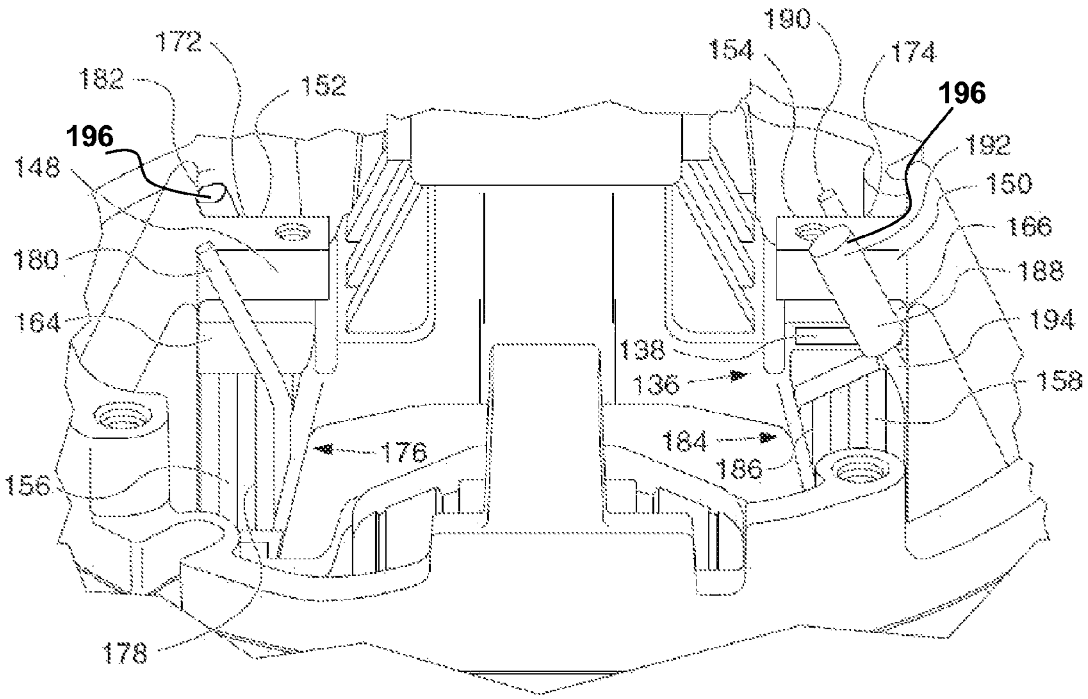
FIG. 3B illustrates a portion of the exemplary embodiment of the operator interface assembly depicted in FIG. 3A.
Figure 3C:
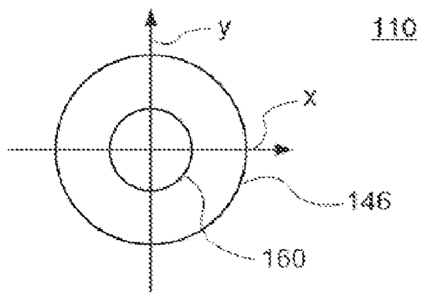
FIG. 3C illustrates a schematic of the exemplary embodiment of an operator interface assembly in FIG. 3A from a different perspective.

Referring now to FIGS. 3A, 3B and 3C, an exemplary embodiment of the operator interface assembly 110 is illustrated. An operator may input a desired machine 100 control command through the operator interface assembly to control a function of the machine 100. The function may include the control of an implement 112, but may alternatively or additionally include other machine functions such as steering, velocity, or transmission gear.

Operators may expect a certain response or feel from an operator interface assembly 110. For example, when the operator interface assembly 110 includes a lever type operator input device 160, the operator may expect that he/she will encounter a first force feedback level while moving the input device 160 from a first position to a second position in a first direction in relation to the base 146. The operator may expect a second, higher, force feedback level when moving the input device 160 in the first direction from the second position to other positions. If the input device 160 controls an implement 112, the operator may expect an implement 112 response to begin when the lever is in a third position, the third position a first defined distance from the second position. The operator may use the different levels of force feedback and/or the first defined distance to control fine movements of the implement 112.

The operator may expect to encounter a deadband region that provides no machine 100 response when moving the operator input device 160 in any direction. Deadband regions are well known in the art and ensure that unintended machine 100 responses to small unintended movement of an operator input device 160 do not occur. These small unintended movements of the operator input device 160 may be caused by machine 100 vibration or unintentional bumping of the operator input device 160. The operator may identify the end of the deadband region by tactile feedback and adjust his/her inputs to the operator interface assembly 110 accordingly.

The operator interface assembly 110 includes a base 146, an operator input device 160, a first biasing member 176, a second biasing member 184, and a position sensor 132. In the depicted embodiment, the operator interface assembly 110 includes a joystick assembly 144.

The base 146 may include any supporting member that would be known to an ordinary person skilled in the art now or in the future. In the depicted embodiment, the base 146 includes a first spring rest 148, a second spring rest 150, a first spring support 156, and a second spring support 158. The base 146 may also include a third spring rest 152 and a fourth spring rest 154. In some embodiments the base 146 may be integral to the cab 106 or other operator station.

The operator input device 160 is operable to move in a first direction in relation to the base 146. In the depicted embodiment the operator input device 160 is pivotally connected to the base 146 such that the operator input device 160 is operable to pivot around an X-axis marked "X". The operator input device 160 may move in a radial direction in relation to the base 146 which may cause a displacement along a y-axis marked "Y". Desired machine 100 control commands may be inputted by an operator as a function of the operator input device 160 displacement along the y-axis. For purposes of this application in relation to the depicted embodiments in FIGS. 3A, 3B, 3*c*, 4A, 4B, and 4C, displacement on the y-axis in one direction is movement in relation to the base 146 in a first direction, and displacement on the y-axis in the opposite direction is referred to as movement in relation to the base 146 in a second direction. In the embodiment depicted, the operator input device 160 may pivot in other directions in relation to the base 146 as well.

The displacement of the operator input device 160 along the y-axis may indicate an operator desired function such as the position of the implement 112. In the embodiment including a tracked dozer 104 depicted in FIG. 1, the displacement of the operator input device 160 along the y-axis may indicate the desired height or lift of the blade 114. In other embodiments the displacement of the operator input device 160 along the y-axis may indicate any operator desired function which would be known to an ordinary person skilled in the art now or in the future.

In some embodiments, the displacement of the operator input device 160 in relation to the x-axis may indicate another operator desired function. In the embodiment including a tracked dozer 104 depicted in FIG. 1, the displacement of the operator input device 160 along the x-axis may indicate the desired tilt of the blade 114. In other embodiments the displacement of the operator input device 160 along the x-axis may indicate any operator desired function which would be known to an ordinary person skilled in the art now or in the future. Controlling machine 100 functions as a function of the displacement of an operator input device 160 in relation to two (2) axes is well known in the art.

In other alternative embodiments the operator input device 160 may be connected to the base 146 to move in a first direction in relation to the base 146 in alternate ways. For example, the operator input device 160 may be slidingly connected to the base 146 to slide in a first direction in relation to the base 146. The operator input device 160 may be connected to the base 146 to move in a first direction in relation to the base 146 in any way that would be known to a person skilled in the art now or in the future.

The operator input device 160 may include any elongated lever type member. In the depicted embodiment, the operator input device 160 includes a joystick 162. The outer outline of the joystick 162 is depicted by a dashed line, with inside portions illustrated with solid lines. In other embodiments the operator input device 160 may be any device that an operator may move in relation to the base 146 to indicate an operator desired function that would be known to an ordinary person skilled in the art now or in the future. Non-limiting examples include spherical shaped devices, levers, and loop or horseshoe shaped handle devices.

The joystick 162 in the depicted embodiment is pivotally connected to the base 146 and operable to move in the first direction from a first position to a second position and a third position in relation to the base 146. The third position is a first defined distance from the second position. The joystick 162 is operable to move in a second direction from a first position to a fourth position and a fifth position in relation to the base 146, the second direction opposite the first direction. The fifth distance is a second defined distance from the fourth distance.

The joystick 162 includes a first tab 164 having a first tab contact surface 168, and a second tab 166 having a second tab contact surface 170. The first tab 164 may have a third tab contact surface 172. The second tab 166 may have a fourth tab contact surface 174.

In systems in which the flow of high pressure hydraulic fluid actuates implements 112, or other machine 100 functions, through mechanical control of valves 122; the operator may experience force feedback from levers or other operator input devices 160 as is known in the art. This force feedback may be provided in electronically controlled systems through biasing members 176, 184, such as springs 178, 186.

The biasing members 176, 184 may bias the operator input member 160 into a first position. The first position may be a neutral position and may correspond to a zero "0" position on the x-axis and y-axis, or intersection of the axes, for a joystick 162 embodiment.

The biasing members 176, 184 may provide force feedback to an operator moving the operator input device 160 in relation to the base 146. The depicted embodiment illustrates two (2) biasing members 176, 184, which provide force feedback to the operator when moving the operator input device 160 in the first direction or in the opposing second direction, displacing the operator input device 160 along the y-axis. In other embodiments there may be additional biasing members 176, 184 which provide force feedback to the operator when moving the operator input device 160 in other directions.

The first biasing member 176 is operatively associated with the base 146, and operable to contact the operator input device 160 at a first position, and resist movement of the operator input device 160 in the first direction.

In the depicted embodiment, the first biasing member 176 includes a first spring 178 having a first spring end 180 and a third spring end 182. The third spring end 182 has a wide portion 192 and a narrow portion 194. The first spring 178 is coiled around the first spring support 156. When the joystick 162 is in the first position, the first spring end 180 rests against the first spring rest 148 and the first tab contact surface 168, and the wide portion 192 of the third spring end 182 rests against the third spring rest 152.

The wide portion 192 and the narrow portion 194 of the third spring end 182 may be formed in one embodiment by fixedly attaching a spacer 196 to a portion of the third spring end 182. In other embodiments, other methods may be used to form the wide portion 192 and the narrow portion 194 of third spring end 182. For example, the first spring 178 may be manufactured with the wide portion 192 and the narrow portion 194 integral to the third spring end 182. In another example, the third spring end 182 may be folded or wrapped to form the wide portion 194.

The second biasing member 184 is operatively associated with the base 146, and operable to contact the operator input device 160 at a second position, the second position different than the first position, and resist movement of the operator input device 160 in the first direction.

In the depicted embodiment, the second biasing member 184 includes a second spring 186 having a second spring end 188 and a fourth spring end 190. The second spring end 190 has a wide portion 192 and a narrow portion 194. The second spring 186 is coiled around the second spring support 158. When the joystick 162 is in the first position, the wide portion 192 of the second spring end 188 rests against the second spring rest 150, and the fourth spring end 190 rests against the fourth spring rest 154 and the fourth tab contact surface 174.

The wide portion 192 and the narrow portion 194 of the second spring end 188 may be formed in one embodiment by fixedly attaching a spacer 196 to portion of the second spring end 188. In other embodiments, other methods may be used to form the wide portion 192 and the narrow portion 194 of second spring end 188. For example, the second spring 188 may be manufactured with the wide portion 192 and the narrow portion 194 integral to the second spring end 188. In another example, second spring end 188 may be folded or wrapped to form the wide portion 194.

When the joystick 162 moves in the first direction from the first position to the second position, the first tab 164 and the second tab 166 move in the first direction. The first spring 178 resists the movement of the joystick 162 from the first position to the second position as the first spring end 180 pushes against the first tab contact surface 168. The second spring 186 does not provide resistance to the joystick 162 movement from the first position to the second position as the wide portion 192 of the second spring end 188 offsets the second spring end 188 from the second tab contact surface 170.

When the joystick 162 is in the second position, the first spring end 180 rests against the first tab contact surface 168, the wide portion 192 of the second spring end 188 rests against the second spring rest 150, and the narrow portion 194 of the second spring end 188 rests against the second tab contact surface 170.

When the joystick 162 moves in the first direction from the second position to the third position, the first tab 164 and the second tab 166 move in the first direction. The first spring 178 and the second spring 186 resist the movement of the joystick 162 from the second position to the third position as the first spring end 180 pushes against the first tab contact surface 168 and the narrow portion 194 of the second spring end 188 pushes against the second tab contact surface 170. The resistance of both the first spring 178 and the second spring 186 to the movement of the joystick 162 from the second position to the third position is greater than the resistance of just the first spring 178 to the movement of the joystick 162 from the first position to the second position.

The position sensor 132 is operable to generate a position signal indicative of the position of the operator input device 160 position. The position sensor 132 may be an electronic position sensor 134. The position signal may be an electronic position signal. Position sensors 132 and electronic position sensors 134 for generating position signals indicative of operator input device 160 positions are well known in the art. One non-limiting example of the electronic position sensor is a hall effect sensor. Hall effect sensors are well known in the art. The position sensor 132 may include any position sensor 132 which would be known by an ordinary person skilled in the art now or in the future to generate a signal indicative of the position of the operator input device 160 in relation to the base 146 in the first direction. The electronic position sensor 134 may include any electronic position sensor 134 which would be known by an ordinary person skilled in the art now or in the future to generate an electronic signal indicative of the position of the operator input device 160 in relation to the base 146 in the first direction.

The position sensor 132 may transmit the position signal to the controller 128 via communication link 142. The controller 128 may determine when the operator input device 160 is in the third position as a function of the position signal. The controller 128 may generate a machine command signal as a function of the operator input device 160 being in the third position. The machine command signal may include an implement control signal.

The first biasing member 176 may additionally be operable to contact the operator input device 160 at a first position, and resist movement of the operator input device 160 in the second direction.

The second biasing member 184 may additionally be operable to contact the operator input device 160 at a fourth position, the fourth position different than the first position, and resist movement of the operator input device 160 in the second direction.

When the joystick 162 moves in the second direction from the first position to the fourth position, the first tab 164 and the second tab 166 move in the second direction. The second spring 186 resists the movement of the joystick 162 from the first position to the fourth position as the fourth spring end 190 pushes against the fourth tab contact surface 174. The first spring 178 does not provide resistance to the joystick 162 movement from the first position to the fourth position as the wide portion 192 of the third spring end 182 offsets the third spring end 182 from the third tab contact surface 172.

When the joystick 162 is in the fourth position, the fourth spring end 190 rests against the fourth tab contact surface 174, the wide portion 192 of the third spring end 182 rests against the third spring rest 152, and the narrow portion 194 of the third spring end 182 rests against the third tab contact surface 172.

When the joystick 162 moves in the second direction from the fourth position to the fifth position, the first tab 164 and the second tab 166 move in the second direction. The first spring 178 and the second spring 186 resist the movement of the joystick 162 from the fourth position to the fifth position as the fourth spring end 190 pushes against the fourth tab contact surface 174 and the narrow portion 194 of the third spring end 182 pushes against the third tab contact surface 172. The resistance of both the first spring 178 and the second spring 186 to the movement of the joystick 162 from the fourth position to the fifth position is greater than the resistance of just the second spring 186 to the movement of the joystick 162 from the first position to the fourth position.

The controller 128 may determine when the operator input device 160 is in the fifth position as a function of the position signal. The controller 128 may generate a machine command signal as a function of the operator input device 160 being in the fifth position. The machine command signal may include the implement command signal The implement actuation system 120 is configured to begin actuation of the implement as a function of the implement command signal. In the implement actuation system 120 depicted in relation to FIG. 2, the implement command signal is a valve actuation signal which actuates the valve 122 to allow pressurized fluid to flow to the actuator 115 to actuate the implement 112.

In one exemplary non-limiting example including the tracked dozer 104, the lift actuators 116 may begin lifting the blade 114 when the joystick 162 is moved to the third position. The lift actuators 116 may begin lowering the blade 114 when the joystick 162 is moved to the fifth position.

In some embodiments, a contact sensor 136 may be fixedly attached to the second tab contact surface 170. The contact sensor 136 may include a thin film sensor 138. The contact sensor 136 is operable to generate a contact signal when the second tab contact surface 170 contacts the narrow portion 192 of the second spring end 188. The contact signal may be communicated to the controller 128 through communication link 142. The contact signal may be used by the controller 128 to implement a calibration method as described in relation to FIG. 5.

In some embodiments, a contact sensor 136 may be fixedly attached to the third tab contact surface 172. The contact sensor 136 may include a thin film sensor 138. The contact sensor 136 is operable to generate a contact signal when the third tab contact surface 172 contacts the narrow portion 192 of the third spring end 182. The contact signal may be communicated to the controller 128 through communication link 142. The contact signal may be used by the controller 128 to implement a calibration method as described in relation to FIG. 5.

Although the operator interface assembly 110 is illustrated and described in the context of a vehicle 102 with an actuator 115 to actuate an implement 112, and more specifically a tracked dozer 104 with a lift actuator 116 and tilt actuator 118 to actuate a blade, ordinary persons skilled in the art will recognize that the operator interface assembly 110 may utilized to control other functions of other machines 100 as well. The tactile force feedback of the springs 178, 186 may assist the operator in controlling functions of the machine 100.

Figure 4A:
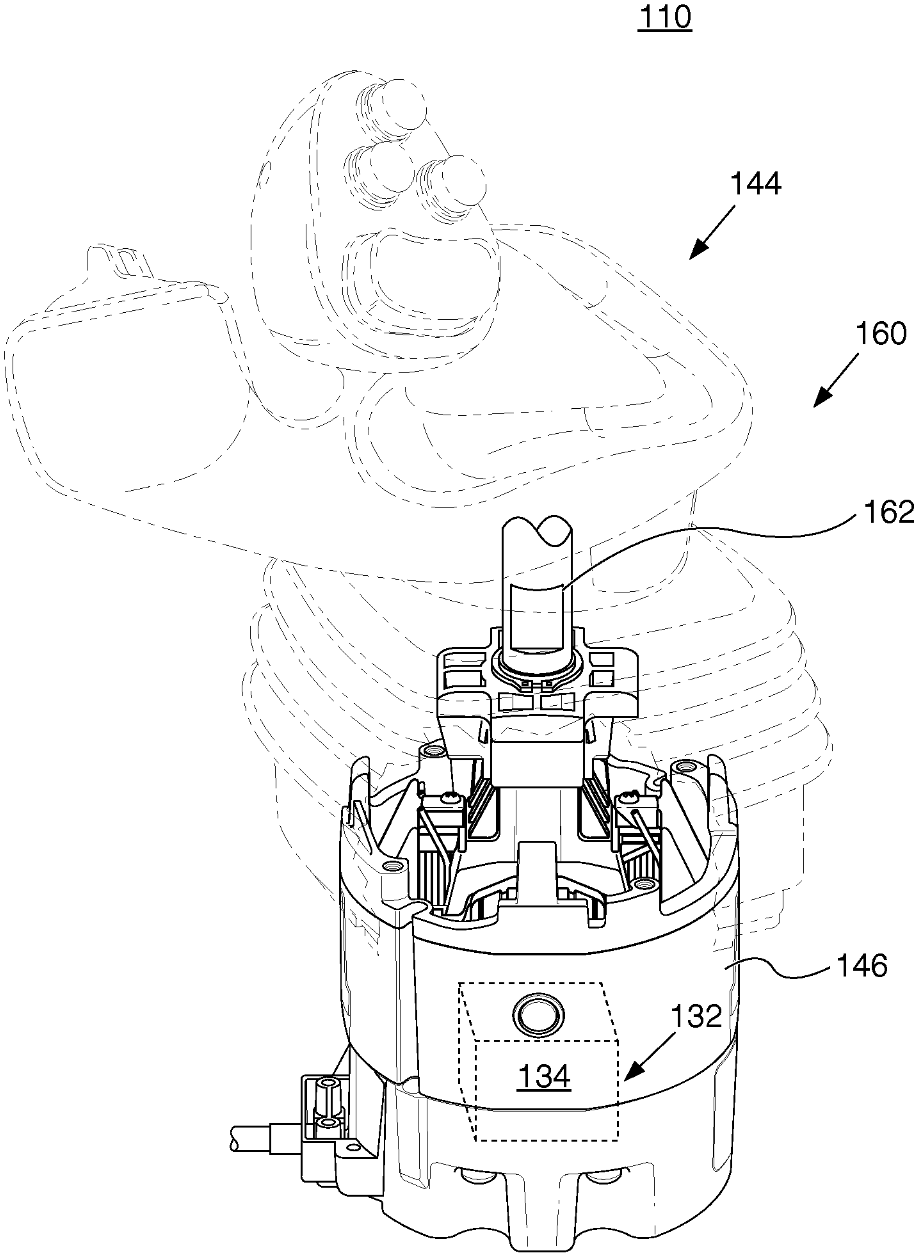
FIG. 4A illustrates another exemplary embodiment of an operator interface assembly.
Figure 4B:
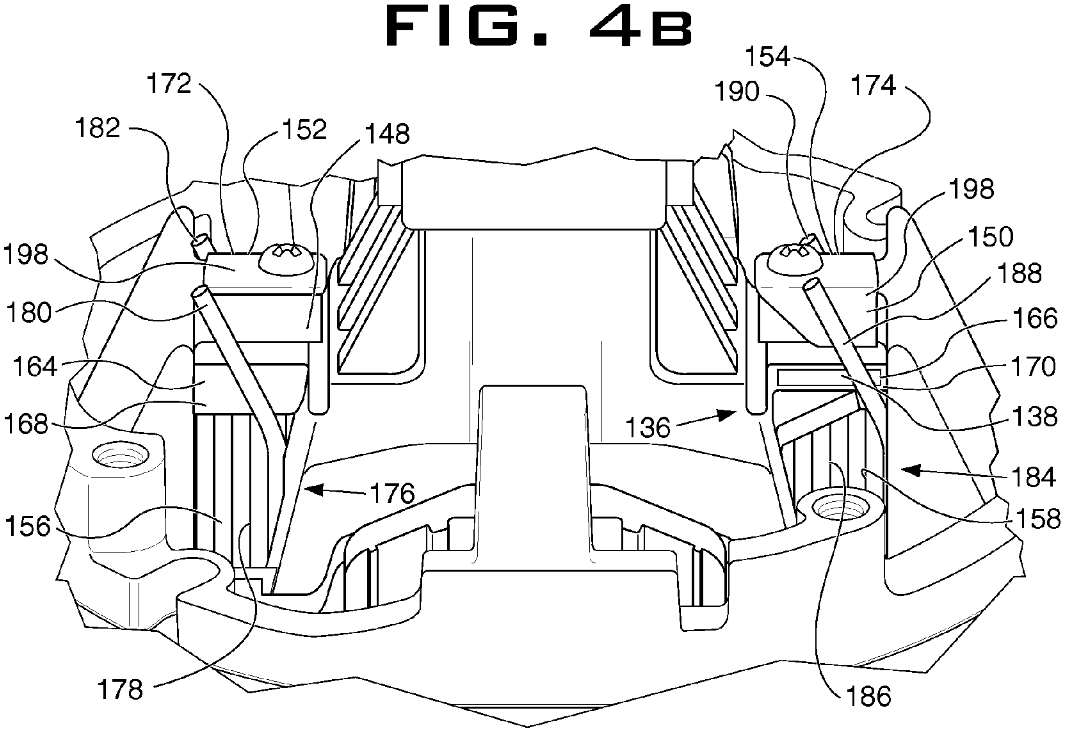
FIG. 4B illustrates a portion of the exemplary embodiment of the operator interface assembly depicted in FIG. 4A.
Figure 4C:
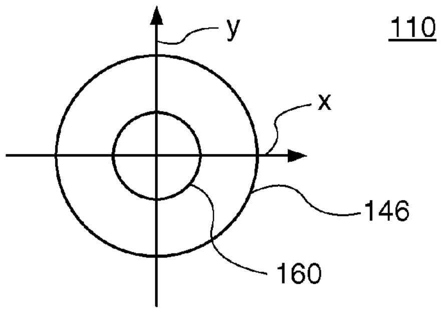
FIG. 4C illustrates a schematic of the exemplary embodiment of an operator interface assembly in FIG. 4A from a different perspective.

Referring now to FIGS. 4A and 4B, another exemplary embodiment of the operator interface assembly 110 is illustrated. The operator interface assembly 110 includes a base 146, an operator input device 160, a first biasing member 176, a second biasing member 184, and a position sensor 132. In the depicted embodiment, the operator interface assembly 110 includes a joystick assembly 144.

The base 146 may include any supporting member that would be known to an ordinary person skilled in the art now or in the future. In the depicted embodiment, the base 146 includes a first spring rest 148, a second spring rest 150, a first spring support 156, and a second spring support 158. The base may additionally include a third spring rest 152 and a fourth spring rest 154. In some embodiments the base 146 may be integral to the cab 106 or other operator station.

The operator input device 160 is operable to move in a first direction in relation to the base 146. In the depicted embodiment the operator input device 160 is pivotally connected to the base 146 such that the operator input device 160 is operable to pivot around an X-axis marked "X". The operator input device 160 may move in a radial direction in relation to the base 146 which may cause a displacement along a y-axis marked "Y". Desired machine 100 control commands may be inputted by an operator as a function of the operator input device 160 displacement along the y-axis. In the embodiment depicted, the operator input device 160 may move in other directions in relation to the base 146 as well.

The displacement of the operator input device 160 along the y-axis may indicate an operator desired function such as the position of the implement 112. In the embodiment including a tracked dozer 104 depicted in FIG. 1, the displacement of the operator input device 160 along the y-axis may indicate the desired height or lift of the blade 114. In other embodiments the displacement of the operator input device 160 along the y-axis may indicate any operator desired machine 100 function which would be known to an ordinary person skilled in the art now or in the future.

In some embodiments, the displacement of the operator input device 160 in relation to the x-axis may indicate another operator desired function. In the embodiment including a tracked dozer 104 depicted in FIG. 1, the displacement of the operator input device 160 along the x-axis may indicate the desired tilt of the blade 114. In other embodiments the displacement of the operator input device 160 along the x-axis may indicate any operator desired machine 100 function which would be known to an ordinary person skilled in the art now or in the future. Controlling machine 100 functions as a function of the displacement of the operator input device in relation to two (2) axes is well known in the art.

In the depicted embodiment, the second spring rest 150 protrudes a first offset distance further in the first direction than the first spring rest 148. In one embodiment, the additional protrusion may be accomplished through fixedly attaching a shim 198 to the base 146. The shim 198 may have a thickness equal to the first offset distance. The shim 198 may be L-shaped with a top section and side section forming the "L". The shim 198 may be glued or welded to the integral base 146 such that the side section forms the second spring rest 150. The top section may be additionally attached to the base 146 with a screw, rivet, or other attachment device. In another embodiment the second spring rest 150 may be manufactured with the additional first offset distance protrusion in the first direction integral to base 146.

In the depicted embodiment, the third spring rest 152 protrudes a second offset distance further in the second direction than the fourth spring rest 154. In one embodiment, the additional protrusion may be accomplished through fixedly attaching a shim 198 to the base 146. The shim 198 may have a thickness equal to the second offset distance. The shim 198 may be L-shaped with a top section and side section forming the "L". The shim 198 may be glued or welded to the integral base 146 such that the side section forms the third spring rest 152. The top section may be additionally attached to the base 146 with a screw, rivet, or other attachment device. In another embodiment the second spring rest 150 may be manufactured with the additional second offset distance protrusion in the second direction integral to base 146.

In the depicted embodiment, the operator input device 160 includes a joystick 162. The outer outline of the joystick 162 is depicted by a dashed line, with inside portions illustrated with solid lines. The joystick 162 in the depicted embodiment is pivotally connected to the base 146 and operable to move in the first direction from a first position to a second position and a third position in relation to the base 146. The third position is a first defined distance from the second position. The joystick 162 is operable to move in a second direction from a first position to a fourth position and a fifth position in relation to the base 146, the second direction opposite the first direction. The fifth position is a second defined distance from the fourth position.

The joystick 162 includes a first tab 164 having a first tab contact surface 168, and a second tab 166 having a second tab contact surface 170. The first tab 164 may have a third tab contact surface 172. The second tab 166 may have a fourth tab contact surface 174.

The biasing members 176, 184 may bias the operator input member 160 into a first position. The first position may be a neutral position and may correspond to a zero "0" position on the x-axis and y-axis, or intersection of the axes, for a joystick 162 embodiment.

The biasing members 176, 184 may provide force feedback to an operator moving the operator input device 160 in relation to the base 146. The depicted embodiment illustrates two (2) biasing members 176, 184, which provide force feedback to the operator when moving the operator input device 160 in the first direction or in an opposing second direction, displacing the operator input device 160 along the y-axis. In other embodiments there may be additional biasing members 176, 184 which provide force feedback to the operator when moving the operator input device 160 in other directions.

The first biasing member 176 is operatively associated with the base 146, and operable to contact the operator input device 160 at a first position, and resist movement of the operator input device 160 in the first direction.

In the depicted embodiment, the first biasing member 176 includes a first spring 178 having a first spring end 180 and a third spring end 182. The first spring 178 is coiled around the first spring support 156. When the joystick 162 is in the first position, the first spring end 180 rests against the first spring rest 148 and the first tab contact surface 168, and the wide portion 194 of the third spring end 180 rests against the third spring rest 152. The third spring end 180 does not rest against the third tab contact surface 172.

The second biasing member 184 is operatively associated with the base 146, and operable to contact the operator input device 160 at a second position, the second position different than the first position, and resist movement of the operator input device 160 in the first direction.

In the depicted embodiment, the second biasing member 184 includes a second spring 186 having a second spring end 188 and a fourth spring end 190. The second spring 186 is coiled around the second spring support 158. When the joystick 162 is in the first position, the second spring end 188 rests against the second spring rest 150, and the fourth spring end 190 rests against the fourth spring rest 154 and the fourth tab contact surface 174. The second spring end 188 does not rest against the second tab contact surface 170.

When the joystick 162 moves in the first direction from the first position to the second position, the first tab 164 and the second tab 166 move in the first direction. The first spring 178 resists the movement of the joystick 162 from the first position to the second position as the first spring end 180 pushes against the first tab contact surface 168. The second spring 186 does not provide resistance to the joystick 162 movement from the first position to the second position as the additional protrusion of the second spring rest 150 offsets the second spring end 188 from the second tab contact surface 170.

When the joystick 162 is in the second position, the first spring end 180 rests against the first tab contact surface 168, and the second spring end 188 rests against the second spring rest 150 and the second tab contact surface 170.

When the joystick 162 moves in the first direction from the second position to the third position, the first tab 164 and the second tab 166 move in the first direction. The first spring 178 and the second spring 186 resist the movement of the joystick 162 from the second position to the third position as the first spring end 180 pushes against the first tab contact surface 168 and the second spring end 188 pushes against the second tab contact surface 170. The resistance of both the first spring 178 and the second spring 186 to the movement of the joystick 162 from the second position to the third position is greater than the resistance of just the first spring 178 to the movement of the joystick 162 from the first position to the second position.

The position sensor 132 is operable to generate a position signal indicative of the position of the operator input device 160 position. The position sensor 132 may be an electronic position sensor 134. The position signal may be an electronic position signal.

The position sensor 132 may transmit the position signal to the controller 128 via communication link 142. The controller 128 may determine when the operator input device 160 is in the third position as a function of the position signal. The controller 128 may generate a machine command signal as a function of the operator input device 160 being in the third position. The machine command signal may include an implement command signal.

The first biasing member 176 may additionally be operable to contact the operator input device 160 at a first position, and resist movement of the operator input device 160 in the second direction.

The second biasing member 184 may additionally be operable to contact the operator input device 160 at a fourth position, the fourth position different than the first position, and resist movement of the operator input device 160 in the second direction.

When the joystick 162 moves in the second direction from the first position to the fourth position, the first tab 164 and the second tab 166 move in the first direction. The second spring 186 resists the movement of the joystick 162 from the first position to the fourth position as the fourth spring end 190 pushes against the fourth tab contact surface 174. The first spring 178 does not provide resistance to the joystick 162 movement from the first position to the fourth position as the additional protrusion of the third spring rest 152 offsets the third spring end 182 from the third tab contact surface 172.

When the joystick 162 is in the fourth position, the third spring end 182 rests against the third tab contact surface 172, and the fourth spring end 190 rests against the fourth spring rest 154 and the fourth tab contact surface 174.

When the joystick 162 moves in the second direction from the fourth position to the fifth position, the first tab 164 and the second tab 166 move in the second direction. The first spring 178 and the second spring 186 resist the movement of the joystick 162 from the fourth position to the fifth position as the third spring end 182 pushes against the third tab contact surface 172 and the fourth spring end 190 pushes against the fourth tab contact surface 174. The resistance of both the first spring 178 and the second spring 186 to the movement of the joystick 162 from the fourth position to the fifth position is greater than the resistance of just the first spring 178 to the movement of the joystick 162 from the first position to the fourth position.

The position sensor 132 may transmit the position signal to the controller 128 via communication link 142. The controller 128 may determine when the operator input device 160 is in the fifth position as a function of the position signal. The controller 128 may generate a machine command signal as a function of the operator input device 160 being in the fifth position. The machine command signal may include an implement command signal.

The implement actuation system 120 is configured to begin actuation of the implement as a function of the implement command signal. In the implement actuation system 120 depicted in relation to FIG. 2, the implement command signal is a valve actuation signal which actuates the valve 122 to allow pressurized fluid to flow to the actuator 115 to actuate the implement 112.

In one exemplary non-limiting example including the tracked dozer 104, the lift actuators 116 may begin lifting the blade 114 when the joystick 162 is moved to the third position. The lift actuators 116 may begin lowering the blade 114 when the joystick 162 is moved to the fifth position.

In some embodiments, a contact sensor 136 may be fixedly attached to the second tab contact surface 170. The contact sensor 136 may include a thin film sensor 138. The contact sensor 136 is operable to generate a contact signal when the second tab contact surface 170 contacts the second spring end 188. The contact signal may be transmitted to the controller 128 through communication link 142. The contact signal may be used by the controller 128 to implement a calibration method as described in relation to FIG. 5.

In some embodiments, a contact sensor 136 may be fixedly attached to the third tab contact surface 172. The contact sensor 136 may include a thin film sensor 138. The contact sensor 136 is operable to generate a contact signal when the third tab contact surface 172 contacts the third spring end 182. The contact signal may be transmitted to the controller 128 through communication link 142. The contact signal may be used by the controller 128 to implement a calibration method as described in relation to FIG. 5.

Although the operator interface assembly 110 is illustrated and described in the context of a vehicle 102 with an actuator 115 to actuate an implement 112, and more specifically a tracked dozer 104 with a lift actuator 116 and tilt actuator 118 to actuate a blade, ordinary persons skilled in the art will recognize that the operator interface assembly 110 may utilized to control other functions of other machines 100 as well.

Figure 5:
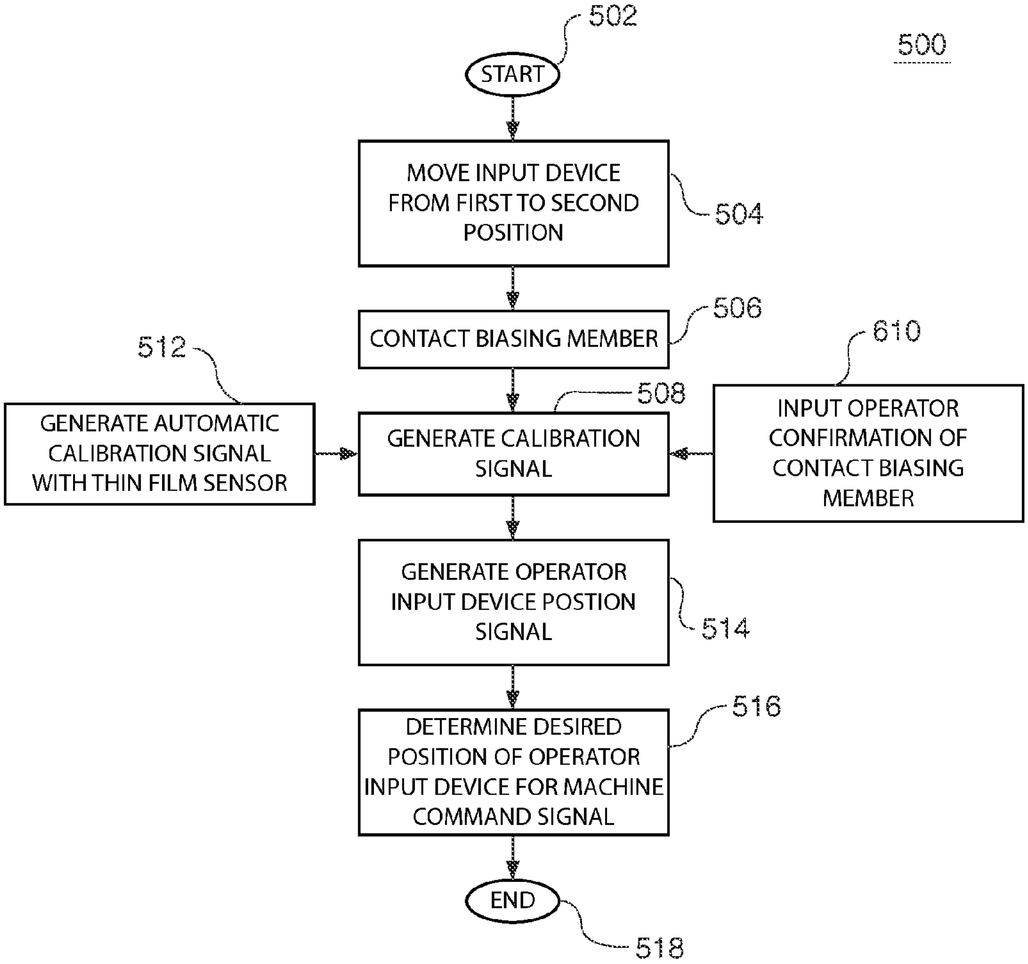
FIG. 5 depicts a flowchart of an exemplary method to calibrate tactile feedback for an operator input device.

Referring now to FIG. 5, a flowchart of an exemplary method 500 to calibrate tactile feedback for an operator input device is depicted. The method 500 includes moving the operator input device 160 in a first direction in relation to the base 146 from the first position to the second position against a resistive force from the first biasing member 176; contacting the second biasing member 184 with the operator input device 160 at the second position, the second biasing member 184 resisting the movement of the operator input device 160 in the first direction at the second position; and generating a calibration signal when the operator input device 160 is in the second position.

For the controller 128 to generate an machine command signal when the operator input device 160 is in the third position as a function of the position signal, the controller 128 must have a value indicative of the third position stored in the memory or receive this information from some source. The value indicative of the third position may be the third position, or it may be the second position and the first defined distance. A value indicative of the third position may be stored in the controller 128 memory at manufacture or a date of service if the operator interface assembly is specified and manufactured for a particular machine 100. In this embodiment, the position of the operator input device 160 when the controller 128 generates the machine command signal may be known.

In other embodiments, the third position may not be known in advance, and a calibration to input a value indicative of the third position may be performed. If the controller 128 receives a contact signal when the operator input device is in the second position, the second position being when the second biasing member 184 contacts and begins to resist the movement of the operator input device 160 in the first direction, the controller 128 may store the position signal generated at the second position. The controller 128 may calculate the third position from the second position and the first defined distance.

The method 500 begins at step 502 and continues to step 504. At step 504 the operator input device 160 moves from the first position to the second position. The first position may be the position that the operator input device 160 is biased to when no force is applied to the operator input device 160 by the operator. The first position may correspond to a neutral state in relation to the machine 100 function which movement of the operator input device 160 in the first direction controls. For example, the first position may correspond to a defined position of an actuator 115, which in turn may correspond to a defined position of an implement 112. For example, the first position may correspond to a defined height or tilt of the blade 114.

The second position may be in a deadband. When the operator input device 160 is moved in the first direction from the first position to the second position, the first biasing member 176 may resist the movement of the operator input device 160 as the first tab contact surface 168 pushes against the first spring end 180. The method 500 continues from step 504 to step 506.

At step 506, the second biasing member 184 contacts the operator input device 160 at the second position. The second biasing member 184 resists the movement of the operator input device 160 in the first direction beginning at the second position. The second tab contact surface 170 contacts the second spring end 186 in the second position. The second spring end 186 pushes against the second tab contact surface when the operator input device 160 moves in the first direction from the second position to other positions. The method 500 moves from step 506 to step 508.

At step 508, a calibration signal is generated when the operator input device 160 is in the second position. The calibration signal may indicate to the controller 128 that the operator input device 160 is in the second position. The controller 128 may store the most recent position signal value to indicate the second position. The controller 128 may then calculate and store the third position value by adding the defined distance to the second position value. The calibration signal may be generated automatically (step 512) or by inputting operator confirmation of the operator input device 160 contacting the second biasing member 184 (step 510). In alternative embodiments the calibration signal may be generated in any way that would be known by an ordinary person skilled in the art now or in the future.

In one embodiment of the invention, the calibration signal may be generated by an operator confirmation of the operator input device 160 contacting the second biasing member 184, which may be inputted via the confirmation input device 130. A person may move the operator input device 160 in the first direction from the first to the second position. The person may feel more force feedback when the operator input device 160 reaches the second position. When the person senses through the force feedback that the operator input device 160 is in the second position, he/she may input an operator confirmation through the confirmation input device 130. The operator confirmation may generate the calibration signal.

The confirmation input device 130 may include any input device with which a person may input the operator confirmation. In one embodiment, the confirmation input device 130 includes a pushbutton. In other embodiments, the confirmation input device may include one or more switches, buttons, keyboards, interactive displays, levers, dials, remote control devices, voice activated controls, or any other operator input devices known by an ordinary person skilled in the art now or in the future. The confirmation input device 130 may be located in the cab 106, another place on-board the machine 100, or remotely. One remote location example includes an electronic service tool.

In another embodiment of the invention, the calibration signal may be generated automatically through a contact sensor 136 on the second tab contact surface 170 or the narrow portion 194 of second spring end 188. In one embodiment the contact sensor 136 includes a thin film sensor 138. In other embodiments the contact sensor 136 may include any sensor which is configured to generate a calibration signal when the operator input device 160 contacts the second biasing member 184 in the second position.

In the embodiment including a contact sensor 136 on the second tab contact surface 170 or the narrow portion 194 of the second spring end 188, when the operator input device 160 moves in the first direction from the first position to the second position, the contact sensor 136 senses that the second tab contact surface 170 has made contact with the narrow portion 194 of the second spring end 188. The contact sensor 136 then generates a calibration signal. The calibration signal is transmitted to the controller 128 via communication link 142. The method 500 moves from step 508 to step 514.

In step 514, the position sensor 132 may generate, and transmit to the controller 128, periodic signals indicative of the position of the operator input device 160, as would be well known by ordinary persons skilled in the art now or in the future. The method moves from step 514 to step 516.

In step 516, the controller 128 determines a desired position of the operator input device 160 for generating a machine 100 control command as a function of the calibration signal and the operator input device 160 position signal. When the controller 128 receives the calibration signal from the contact sensor 136 or the confirmation input device 130, the controller 128 may identify the most recent position signal received and associate the operator input device 160 position indicated by the position signal with the second position. The controller 128 may add the first defined distance to the second position to determine the third position. The third position includes the desired position of the operator input device 160 for generating a machine 100 control command. The method moves from step 516 to step 518.

The method ends at step 518.

Although method 500 is described in relation to calibration of tactile feedback for an operator input device 160 moving from the first position to the second and third position in the first direction, it will be apparent to ordinary persons skilled in the art that the same method is applicable for calibration of tactile feedback for an operator input device 160 moving from the first position to the fourth position and the fifth position in the second direction.

INDUSTRIAL APPLICABILITY

Operators of machinery may depend on tactile feedback from operator input devices 160 to control fine movements of implements 112 or other machine 100 functions. Electrically actuated valve control of implements 112 or other machine 100 functions may not provide the tactile feedback that operators expect, making fine movement of implements 112 or operating of other machine 100 functions difficult.

Operator interface assembly 110 may provide tactile feedback to an operator of a machine 100. One level of force feedback is provided by resistance from the first biasing member 176 when the operator input device 160 is moved in the first direction from the first position to the second position. A second higher level of resistance is provided by resistance from the first biasing member 176 and the second biasing member 184 when the operator input device 160 is moved in the first direction from the second position to the third position. The controller 128 may generate a machine 100 control command to begin a machine function when the operator device 160 is in the third position. The machine 100 control command may include an implement 112 control command to begin actuation of an implement 112 on a machine 100.

In the same manner, one level of force feedback is provided by resistance from the second biasing member 184 when the operator input device 160 is moved in the second direction from the first position to the fourth position. A second higher level of resistance is provided by resistance from the first biasing member 176 and the second biasing member 184 when the operator input device 160 is moved in the second direction from the fourth position to the fifth position. The controller 128 may generate a machine 100 control command to begin a machine function when the operator device 160 is in the fifth position. The machine 100 control command may include an implement 112 control command to begin actuation of an implement 112 on a machine 100.

The change in levels of force feedback when an operator moves the operator input device 160 may indicate to the operator when a machine 100 function will begin. The machine 100 function may include actuation of the implement 112. The operator may find it easier to accomplish fine implement 112 movements when he/she can anticipate when actuation of an implement 112 will begin.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. An operator interface assembly for a machine, comprising:

a base, an operator input device operable to move in a first direction in relation to the base to a second position and a third position, and operable to move in a second direction in relation to the base, the second direction opposite the first direction, to a fourth position and a fifth position, a first biasing member including a first spring end and a third spring end, and operatively associated with the base and wherein the first spring end is operable to contact the operator input device at the first position and resist movement of the operator input device in the first direction, and the third spring end is operable to contact the operator input device at the fourth position and resist movement of the operator input device in the second direction, a second biasing member including a second spring end and a fourth spring end, and operatively associated with the base and wherein the second spring end is operable to contact the operator input device at the second position and resist movement of the operator input device in the first direction, and the fourth spring end is operable to contact the operator device at the first position and resist movement of the operator input device in the second direction, and a position sensor configured to generate a position signal for generating a machine control command, the position signal indicative of the operator input device position, and wherein the first position, the second position, and the fourth position are different positions.

2. The operator interface assembly of claim 1, wherein the operator input device is pivotably connected to the base.

3. The operator interface assembly of claim 1, wherein the operator input device is slidingly connected to the base.

4. The operator interface assembly of claim 1, wherein the first biasing member includes a spring.

5. The operator interface assembly of claim 1, wherein the position sensor is an electronic position sensor configured to generate an electronic position signal indicative of the operator input device position.

6. A machine, comprising:

an implement, an implement actuation system configured to begin actuation of the implement as a function of an implement control signal, an operator interface assembly, including;

a base, an operator input device operable to move in a first direction in relation to the base to a second position and a third position, and operable to move in a second direction in relation to the base, the second direction opposite the first direction, to a fourth position and a fifth position, a first biasing member including a first spring end and a third spring end, and operatively associated with the base and wherein the first spring end is operable to contact the operator input device at the first position and resist movement of the operator input device in the first direction, and the third spring end is operable to contact the operator input device at the fourth position and resist movement of the operator input device in the second direction, a second biasing member including a second spring end and a fourth spring end, and operatively associated with the base and wherein the second spring end is operable to contact the operator input device at the second position and resist movement of the operator input device in the first direction, and the fourth spring end is operable to contact the operator device at the first position and resist movement of the operator input device in the second direction, and an electronic position sensor operable to generate an electronic position signal indicative of the operator input device position, and a controller configured to generate a machine command signal as a function of the electronic position signal, and wherein the first position, the second position, the third position, the fourth position, and the fifth position are different positions.

7. The machine of claim 6, wherein:

the implement actuation system includes a solenoid controlled valve operable to allow pressurized fluid flow to actuate the implement when in an open position, and the machine command signal initiates electric current flow to move the solenoid controlled valve to the open position.

8. The machine of claim 6, wherein the implement includes an earth moving blade.

9. The machine of claim 6, wherein the implement actuation system includes a hydraulic cylinder actuated through the flow of hydraulic fluid, the hydraulic cylinder operable to change the position of the implement.

10. The machine of claim 6, wherein the controller is configured to generate the machine command signal when the operator input device is in the third position or the fifth position.

11. An operator interface assembly, comprising:

a base including a first spring rest, a second spring rest, a first spring support, and a second spring support, a joystick pivotally connected to the base, the joystick operable to pivot in a first direction from a first position to a second position and a third position in relation to the base, and pivot in a second direction, the second direction opposite the first direction, from the first position to a fourth position and a fifth position in relation to the base, the joystick including a first tab having a first tab contact surface and a third tab contact surface, and a second tab having a second tab contact surface and a fourth tab contact surface, a first spring coiled around the first spring support and including a first spring end and a third spring end, wherein the first spring end contacts the first spring rest and the first tab contact surface when the joystick is in the first position; and the third spring end contacts the first spring rest and is a first offset distance from the third tab contact surface when the joystick is in the first position, and contacts the third tab contact surface when the joystick is in the fourth position, a second spring coiled around the second spring support and including a second spring end and a fourth spring end, wherein; the second spring end contacts the second spring rest and is a first offset distance from the second tab contact surface when the joystick is in the first position, and contacts the second tab contact surface when the joystick is in the second position; and the fourth spring end contacts the second spring rest and the fourth tab contact surface when the joystick is in the first position, and an electronic position sensor operable to generate an electronic position signal indicative of the joystick position for generating a machine command signal when the joystick is in the third position or the fifth position.

12. The operator interface assembly of claim 11, wherein:

the second spring end includes a wide portion and a narrow portion, the wide portion contacts the second spring rest when the joystick is in the first position, and the narrow portion contacts the second tab contact surface when the joystick is in the second position.

13. The operator interface assembly of claim 11, wherein:

the first spring support and the second spring support are symmetrical, and the second spring rest protrudes the first offset distance further than the first spring rest in a second direction, the second direction opposite the first direction.

14. The operator interface assembly of claim 11, wherein:

the third spring end includes a wide portion and a narrow portion, the wide portion contacts the third spring rest when the joystick is in the first position, and the narrow portion contacts the third tab contact surface when the joystick is in the fourth position.

15. The operator interface assembly of claim 11, wherein:

the first spring support and the second spring support are symmetrical, and the third spring rest protrudes the second offset distance further than the fourth spring rest in the first direction.

16. A method for calibrating tactile feedback for an operator input device, comprising:

moving the operator input device in a first direction in relation to a base from a first position to a second position against a resistive force from a first biasing member, contacting a second biasing member with the operator input device at the second position, the second biasing member resisting the movement of the operator input device in the first direction in the second position, generating a calibration signal when the operator input device is in the second position, generating a periodic position signal indicative of the position of the operator input device, and determining a desired position of the operator input device for triggering a machine command signal as a function of the most recent position signal when the calibration signal is generated, and generating a machine command signal when the position signal indicates the operator input device is in the desired position.

17. The method of claim 16, wherein generating a calibration signal includes inputting an operator confirmation on a confirmation input device.

18. The method of claim 16, wherein generating a calibration signal includes generating an automatic confirmation signal with a contact sensor.

19. The method of claim 16, wherein the contact sensor is a thin film sensor.

* * * * *